2,979,489
Patented Apr. 11, 1961

2,979,489
COPOLYMERS OF 2-TRIFLUOROMETHYL-1,3-BUTADIENE

Elizabeth S. Lo, Elizabeth, N.J., assignor, by mesne assignments, to Minnesota Mining and Manufacturing Company, St. Paul, Minn., a corporation of Delaware No Drawing. Filed June 20, 1956, Ser. No. 592,512

7 Claims. (Cl. 260—87.5)

This invention relates to, and has for its object, the preparation of new and useful copolymers of 2-trifluoromethyl-1,3-butadiene. More particularly, the invention relates to, and has for its object, the preparation of thermoplastic copolymers of 2-trifluoromethyl-1,3-butadiene having a wide variety of commercial uses and applications. Still more particularly, the invention relates to, and has for its object, a method for the preparation of these copolymers. Other objects and advantages inherent in the invention will become apparent from the accompanying description and disclosure.

It is known that the homopolymer of 2-trifluoromethyl-1,3-butadiene, possesses elastomeric properties, thermal stability and can be fabricated into a variety of commercially useful articles. It has also been found, however, that the homopolymers of 2-trifluoromethyl-1,3-butadiene can be attacked by various strong reagents and exhibit poor solvent-swell characteristics, when subjected thereto, in the course of performing their function when incorporated in various articles of manufacture.

In accordance with the present invention, it has been found that the incorporation of 2-chloropentafluoropropene (under the conditions more fully hereinafter described) into the polymer of 2-trifluoromethyl-1,3-butadiene, improves the properties of the 2-trifluoromethyl-1,3-butadiene homopolymer to such an extent that excess solvent-swell is appreciably prevented and that the 2-trifluoromethyl-1,3-butadiene homopolymer is not attacked, thereby resulting in a new and useful copolymeric composition. These copolymeric compositions of 2-trifluoromethyl-1,3-butadiene and 2-chloropentafluoropropene, an addition to being highly resistant to excess solvent-swell, exhibit increased resistance to oil and hydrocarbon fuels, improved flow properties and improved chemical and physical stability. These copolymeric compositions constitute valuable macromolecules and are adaptable to a wide variety of commercial uses. They are selectively soluble in various commercial solvents and serve as durable, flexible, protective coatings on surfaces which are subjected to environmental conditions in which they may come into contact with any of the aforementioned corrosive substances.

In general, the copolymeric compositions of the present invention are produced from the polymers of monomeric mixtures containing 2-trifluoromethyl-1,3-butadiene and 2-chloropentafluoropropene at temperatures between about −20° C. and about 120° C., with intermediate temperature ranges being selected with reference to the specific copolymerization system employed. The most useful copolymeric compositions of the present invention are copolymers produced from monomeric mixtures containing between about 30 mole percent and about 85 mole percent of the 2-chloropentafluoropropene and the remaining major monomeric constituent being the 2-trifluoromethyl-1,3-butadiene. The preferred copolymeric systems of the present invention are copolymers produced from monomeric mixtures containing between about 30 mole percent and about 70 mole percent of the 2-chloropentafluoropropene and the remaining major monomeric constituent being the 2-trifluoromethyl-1,3-butadiene. In this respect, it is found that if the monomeric charge contains less than about 30 mole percent of the 2-chloropentafluoropropene monomer, the resulting copolymeric product exhibits poor resistance to solvent-swell, so that the copolymer becomes unsuitable for use in commercial operations.

The elastomeric polymeric compositions of the present invention are preferably prepared by carrying out the polymerization reaction in the presence of a free radical-forming promoter. For this purpose, the polymerization reaction is carried out by employing a water-soluble peroxy type initiator in a water-suspension type recipe or an organic peroxide initiator in a bulk-type system. The water-suspension type recipe is preferred.

The water-suspension type system contains a water-soluble peroxy-type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt such as ferrous sulfate or ferrous nitrate to accelerate the copolymerization reaction. The water-soluble initiator present in the water-suspension type recipe system comprises between about 0.1 and about 5 parts by weight per 100 parts of total monomers present. The variable-valence metal salt is preferably employed in an amount between about 0.01 and about 0.2 part by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In these water-suspension type recipe systems, it is desirable to employ an emulsifying agent. This emulsifying agent is present either in the form of a metallic salt or an aliphatic acid having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acid or salts thereof, serving as emulsifying agents in the above-mentioned water-suspension type recipe systems, are polyfluorocarboxylic acids (e.g., perfluorooctanoic acid) or perfluorochlorocarboxylic acid salts (e.g., trifluorochloroethylene telomer acid soaps). The polyfluorocarboxylic acids which may be employed are such as those disclosed in U.S. Patent No. 2,559,752; and the non-acidic derivatives of the acids disclosed therein as being effective dispersing agents may also be used in the process of the present invention. The perfluorochlorocarboxylic acid salts which may be used in accordance with this invention are those disclosed in co-pending application Serial No. 501,782, filed April 18, 1955, as being useful dispersing agents in polymerization reactions. In general, these emulsifying agents are present in an amount between about 0.5 and about 10 parts by weight per 100 parts of total monomers present.

The polymerization reaction is preferably conducted under alkaline conditions. It is desirable, therefore, that the pH be maintained between about 7 and 11 in order to prevent gelling of the resulting polymeric product, a condition which often causes slow-down or stoppage of the polymerization reaction. In this respect, it should be noted that it is sometimes necessary to maintain the pH of the system within the aforementioned pH limits by the addition of suitable buffer agents. Typical examples are sodium borate and disodium phosphate.

As indicated above, the polymerization reaction may also be carried out with the initiator being present in the form of an organic peroxide in a bulk-type polymerization system. Of these organic peroxide promoters, halogen-substituted peroxides are most desirable. A preferred promoter of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, chloroacetyl peroxide, 2,4-dichlorobenzoyl peroxide, dichlorofluoroacetyl peroxide, benzoyl peroxide and di-tertiary butyl peroxide.

As previously indicated, the polymerization reaction is carried out, in general, at a temperature between about $-20°$ C. and about $120°$ C. When the polymerization reaction is carried out employing a water-suspension type recipe, temperatures between about $15°$ C. and about $75°$ C. are preferably employed. When the polymerization reaction is carried out in the presence of an organic peroxide initiator in a bulk-type polymerization system, temperatures over the entire range of between about $-20°$ C. and about $120°$ C. are preferably employed depending upon the decomposition temperature of the promoter. The polymerization reactions described herein to produce the polymeric compositions of the present invention are carried out under autogenous conditions of pressure.

As previously indicated, the polymeric compositions of the present invention are particularly suitable and useful when employed in the form of durable, flexible coatings on a wide variety of surfaces, and particularly on surfaces which are subjected to distortion in normal use, such as fabric surfaces. For this purpose, the polymeric composition may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces the molecular weight of the polymeric compositions and increases their solubility, without affecting, unduly, the overall yield. Suitable polymerization modifiers include chloroform ($CHCl_3$), Freon-113 ($CF_2ClCFCl_2$), carbon tetrachloride ($CCl_4$), trichloroacetyl chloride ($CCl_3COCl$), bromotrichloromethane ($CBrCl_3$), dodecyl mercaptan ($C_{12}H_{25}SH$) and mixed tertiary mercaptans. These modifiers are preferably added in amounts between about 0.01 and about 10 parts by weight per 100 parts of total monomers charged to the polymerization reaction. Dodecyl mercaptan is preferred.

The following examples are offered for a better understanding in producing the elastomeric copolymeric compositions of the present invention and are not to be construed as limiting its scope.

*Example I*

A heavy-walled glass polymerization tube of about 20 ml. capacity was flushed with nitrogen and then charged with 5 ml. of a catalyst solution prepared by dissolving 0.75 gram of the $C_8$ telomer acid of trifluorochloroethylene, viz., $Cl(CF_2CFCl)_3CF_2COOH$, in 100 ml. of water. This solution in the polymerization tube was then frozen. Thereafter, there was added to the polymerization tube 4 ml. of a solution prepared by dissolving 1 gram of potassium persulfate in 80 ml. of water. The contents of the tube were then refrozen. Thereafter, there was added to the frozen contents of the tube 1 ml. of a solution prepared by dissolving 0.4 gram of sodium metabisulfite in 20 ml. of water. The contents of the tube were once more frozen. The tube was next connected to a gas-transfer system and evacuated at liquid nitrogen temperature. To the frozen contents of the tube were added, by distillation, 1.85 grams of 2-chloropentafluoropropene and 3.15 grams of 2-trifluoromethyl-1,3-butadiene, which comprised a total monomeric charge containing 30 mole percent of 2-chloropentafluoropropene and 70 mole percent of 2-trifluoromethyl-1,3-butadiene.

The polymerization tube was next sealed under vacuum and agitated in a temperature-regulated water-bath at $50°$ C. for a period of 17 hours. At the end of this time, the contents of the tube were coagulated by freezing at liquid nitrogen temperature. The coagulated product was then removed from the tube, washed with hot water and then dried to constant weight in vacuo at $35°$ C. An elastomeric copolymeric product was obtained, which was found to comprise 2-chloropentafluoropropene and 2-trifluoromethyl-1,3-butadiene in an amount of 2.1 grams. This amount corresponded to a 42% conversion. This copolymer when subjected to the action of ASTM type II fuel, consisting of isooctane (60% by volume), benzene (5% by volume), toluene (20% by volume) and xylene (15% by volume), is found to show no appreciable solvent-swell increase.

*Example II*

Employing the procedure set forth in Example I and the same polymerization system, the tube was charged with 2.88 grams of 2-chloropentafluoropropene and 2.12 grams of 2-trifluoromethyl-1,3-butadiene, to make up a total monomer charge containing 50 mole percent of each monomer. The polymerization reaction was carried out at a temperature of $50°$ C. for a period of 17 hours. The resultant product was worked up in accordance with the same procedure as set forth in Example I. An elastomeric copolymeric product was obtained which was found to comprise 2-chloropentafluoropropene and 2-trifluoromethyl-1,3-butadiene in an amount of 1.4 grams. This amount corresponded to a 28% conversion. When subjected to the action of the aforementioned ASTM type II fuel, no appreciable increase in solvent-swell is noted.

*Example III*

Employing the procedure set forth in Example I and the same polymerization system, the tube was charged with 3.36 grams of 2-chloropentafluoropropene and 1.64 grams of 2-trifluoromethyl-1,3-butadiene, to make up a total monomer charge containing 60 mole percent of the 2-chloropentafluoropropene and 40 mole percent of the 2-trifluoromethyl-1,3-butadiene. The polymerization reaction was carried out at a temperature of $50°$ C. and for a period of 17 hours. The resultant product was worked up in accordance with the procedure set forth in Example I. An elastomeric copolymeric product was obtained which was found to comprise 2-chloropentafluoropropene and 2-trifluoromethyl-1,3-butadiene in an amount of 1.05 grams. This amount corresponded to a 21% conversion. When subjected to the action of the aforementioned ASTM type II fuel, no appreciable increase in solvent-swell is noted.

*Example IV*

Employing the procedure set forth in Example I and the same polymerization system, the tube was charged with 3.8 grams of 2-chloropentafluoropropene and 1.2 grams of 2-trifluoromethyl-1,3-butadiene, to make up a total monomer charge containing 70 mole percent of 2-chloropentafluoropropene and 30 mole percent of 2-trifluoromethyl-1,3-butadiene. The polymerization reaction was carried out at a temperature of $50°$ C. for a period of 17 hours. The resultant product was worked up in accordance with the same procedure as set forth in Example I. An elastomeric copolymeric product was obtained which was found to comprise 2-chloropentafluoropropene and 2-trifluoromethyl-1,3-butadiene in an amount of 0.95 gram. This amount corresponded to a 19% conversion. When subjected to the action of the ASTM type II fuel, no appreciable increase in solvent-swell is noted.

*Example V*

To illustrate the criticality of employing a monomeric charge of 2-chloropentafluoropropene and 2-trifluoromethyl-1,3-butadiene in which the 2-chloropentafluoropropene is present in an amount of less than 30 mole percent, the copolymerization reaction of these two monomers was carried out as follows:

The procedure set forth in the above examples and the same polymerization system was employed. However, the tube was charged with 2.48 grams of 2-chloropentafluoropropene and 2.52 grams of 2-trifluoromethyl-1,3-butadiene, which comprised a monomer mixture containing only 11 mole percent of the 2-chloropentafluoropropene and 89 mole percent of the 2-trifluoromethyl-1,3-butadiene. The polymerization reaction was carried out at a temperature of 50° C. and for a period of 25 hours. The resultant product was worked up in accordance with the same procedure as set forth in the examples. A thermoplastic product was obtained which was found to comprise 2-chloropentafluoropropene and 2-trifluoromethyl-1,3-butadiene in an amount of 2.75 grams. This amount corresponded to a 55% conversion. However, it was noted that when this copolymer was subjected to the action of ASTM type II fuel, the copolymer was readily attacked and resulted in a gel.

As previously indicated, the copolymeric compositions of the present invention possess highly desirable physical and chemical properties which make them useful for fabrication of a wide variety of thermoplastic articles, or for the application to various surfaces as protective coatings. In such uses, the raw elastomeric copolymer, such as is produced in accordance with the procedure set forth in the above examples, is extruded or pressed into sheets at temperatures between about 250° F. and about 400° F. and at a pressure between about 500 and about 15,000 pounds per square inch for a period of about 5 to about 60 minutes. Thereafter, various articles can be molded from preforms cut from sheets and extruded stock in the form of gaskets, diaphragms, packings, etc. In this respect, it is preferred in such applications, that the raw copolymer also includes various vulcanizing agents and fillers.

When employed as protective coatings on any of the surfaces previously described, the raw copolymeric composition is dissolved in any of the aforementioned solvents and is applied to the desired surfaces, employing such apparatus as a knife-spreader or a doctor-blade or a reverse-roll coater. The solvent, after the copolymeric coating composition has been applied to the surface, is permitted to evaporate. This may also be accomplished in the presence of elevated temperatures, if so desired. In many applications, it is desirable to include in the copolymeric coating compositions, various vulcanizing agents. In the latter case, supplementary heat-treatment of the coating is required, either during the solvent-removal step or thereafter. After the solvent has been completely evaporated, the coated surface is ready for use. In this respect, it should be noted that the polymeric coating composition may be applied to the surface either as a single coating or, if so desired, the protective coating may be built up by the application of several layers, each layer being permitted to harden by solvent evaporation before the next layer is applied. Furthermore, if so desired, the protective coatings, or the polymeric composition, when obtained in the form of sheets, may be suitably pigmented.

Other uses for the copolymeric compositions of the present invention reside in the fabrication of belting hose, mountings, piston and pump-valves, sheet or valve disks, rolls, tubing, pressure-sensitive tape for electrical insulation purposes, gromets, or as adhesives for fastening a rubber surface to a metal or another rubber surface.

Since certain changes may be made in carrying out the process of the present invention in producing the desired copolymeric compositions without departing from the scope of the invention, it is intended that all matter contained in the above description is to be interpreted as illustrative and not in a limiting sense.

I claim:

1. A process which comprises polymerizing a monomeric mixture of 2-chloropentafluoropropene and 2-trifluoromethyl-1,3-butadiene, said mixture containing between about 30 mole percent and about 85 mole percent 2-chloropentafluoropropene and the remaining major constituent being the 2-trifluoromethyl-1,3-butadiene in the presence of a polymerization promoter comprising a peroxy compound at a temperature between about −20° C. and about 120° C.

2. A process which comprises polymerizing a monomeric mixture of 2-chloropentafluoropropene and 2-trifluoromethyl-1,3-butadiene, said mixture containing between about 30 mole percent and about 85 mole percent 2-chloropentafluoropropene and the remaining major constituent being the 2-trifluoromethyl-1,3-butadiene in the presence of a polymerization promoter comprising an inorganic peroxy compound at a temperature between about 15° C. and about 75° C.

3. A process which comprises polymerizing a monomeric mixture of 2-chloropentafluoropropene and 2-trifluoromethyl-1,3-butadiene, said mixture containing between about 30 mole percent and about 85 mole percent 2-chloropentafluoropropene and the remaining major constituent being the 2-trifluoromethyl-1,3-butadiene in the presence of a polymerization promoter comprising an organic peroxy compound at a temperature between about −20° C. and about 120° C.

4. A process which comprises polymerizing a monomeric mixture of 2-chloropentafluoropropene and 2-trifluoromethyl-1,3-butadiene, said mixture containing between about 30 mole percent and about 70 mole percent 2-chloropentafluoropropene and the remaining major constituent being the 2-trifluoromethyl-1,3-butadiene in the presence of a polymerization promoter comprising a peroxy compound at a temperature between about −20° C. and about 120° C.

5. A process which comprises polymerizing a monomeric mixture of 2-chloropentafluoropropene and 2-trifluoromethyl-1,3-butadiene, said mixture containing between about 30 mole percent and about 70 mole percent 2-chloropentafluoropropene and the remaining major constituent being the 2-trifluoromethyl-1,3-butadiene in the presence of a polymerization promoter comprising an inorganic peroxy compound at a temperature between about 15° C. and about 75° C.

6. A process which comprises polymerizing a monomeric mixture of 2-chloropentafluoropropene and 2-trifluoromethyl-1,3-butadiene, said mixture containing between about 30 mole percent and about 70 mole percent 2-chloropentafluoropropene and the remaining major constituent being the 2-trifluoromethyl-1,3-butadiene in the presence of a polymerization promoter comprising an organic peroxy compound at a temperature between about −20° C. and about 120° C.

7. A copolymer from 30 to 85 mole percent of 2-chloropentafluoropropene and 70 to 15 mole percent of 2-trifluoromethyl-1,3-butadiene.

References Cited in the file of this patent
UNITED STATES PATENTS

| | | |
|---|---|---|
| 2,484,530 | Schroeder | Oct. 11, 1949 |
| 2,490,753 | Hill et al. | Dec. 6, 1949 |
| 2,636,908 | Dittman et al. | Apr. 28, 1953 |
| 2,694,701 | Blum et al. | Nov. 16, 1954 |
| 2,793,200 | West | May 21, 1957 |
| 2,793,201 | Gochenour et al. | May 21, 1957 |